(12) United States Patent
Patterson

(10) Patent No.: US 11,015,293 B2
(45) Date of Patent: May 25, 2021

(54) SHEET CHARACTERIZATION OF CREPE PAPER

(71) Applicant: SOLENIS TECHNOLOGIES, L.P., Wilmington, DE (US)

(72) Inventor: Timothy Patterson, Wilmington, DE (US)

(73) Assignee: SOLENIS TECHNOLOGIES, L.P., Wilmington, DE (US)

( * ) Notice: Subject to any disclaimer, the term of this patent is extended or adjusted under 35 U.S.C. 154(b) by 110 days.

(21) Appl. No.: 16/100,719

(22) Filed: Aug. 10, 2018

(65) Prior Publication Data

US 2020/0048837 A1  Feb. 13, 2020

(51) Int. Cl.

| | |
|---|---|
| *D21F 7/06* | (2006.01) |
| *D21G 9/00* | (2006.01) |
| *B31F 1/14* | (2006.01) |
| *D21H 27/00* | (2006.01) |
| *D21G 3/00* | (2006.01) |
| *G01B 11/06* | (2006.01) |

(52) U.S. Cl.
CPC ............ *D21G 9/0036* (2013.01); *B31F 1/145* (2013.01); *D21F 7/06* (2013.01); *D21G 3/005* (2013.01); *D21H 27/005* (2013.01); *G01B 11/0691* (2013.01); *G06T 2207/10152* (2013.01); *G06T 2207/20056* (2013.01); *G06T 2207/30124* (2013.01)

(58) Field of Classification Search
USPC ........................................................ 162/263
See application file for complete search history.

(56) References Cited

U.S. PATENT DOCUMENTS

| | | |
|---|---|---|
| 4,978,861 A | 12/1990 | Sabater et al. |
| 5,680,321 A | 10/1997 | Helmer et al. |
| 5,944,958 A | 8/1999 | Svanqvist |
| 7,545,971 B2 | 6/2009 | Shakespeare |
| 8,958,898 B2 | 2/2015 | Von Drasek et al. |
| 9,189,864 B2 | 11/2015 | Kellomaki |
| 9,238,889 B2 | 1/2016 | Paavola et al. |
| 9,303,977 B2 | 4/2016 | Kellomaki et al. |
| 2008/0013818 A1 | 1/2008 | Shakespeare |
| 2013/0116812 A1 | 5/2013 | Drasek et al. |
| 2013/0230213 A1 | 9/2013 | Maladen |
| 2015/0110359 A1 | 4/2015 | Kellomaki |

FOREIGN PATENT DOCUMENTS

| | | |
|---|---|---|
| WO | 2013103831 A1 | 7/2013 |
| WO | 2014087046 A1 | 6/2014 |

OTHER PUBLICATIONS

ISA/US, International Search Report and Written Opinion issued in Int. Appl. No. PCT/US2019/046195 dated Nov. 4, 2019.

*Primary Examiner* — Mark Halpern
(74) *Attorney, Agent, or Firm* — Lorenz & Kopf, LLP

(57) ABSTRACT

The current method relates to an on-line characterization of paper or paper products, such as tissue or other crepe paper products. The method uses an imaging source wherein one or more images are obtained of the sheets surface or topographical area or region, or the image is of an edge of a formed sheet. The one or more images are enhanced and analyzed using various techniques and metrics for characterizing the structure of the formed sheet. The information provides for real time adjustments on the machine.

16 Claims, 10 Drawing Sheets

Horizontal (MD) Frequency

Horizontal (MD) Frequency

SHEET CHARACTERIZATION OF CREPE PAPER

TECHNICAL FIELD

The present disclosure pertains to a creped paper, such as tissue or towel, is produced by pressing a wet fibrous web against the surface of a heated cylindrical dryer, called a Yankee dryer or Yankee cylinder, which terms will be used interchangeably, so that the wet fibrous web adheres thereto, followed by drying, and then stripping the dry fiber web from the Yankee dryer using a doctor blade or a crepe blade.

BACKGROUND

Creping processes are well known in the art. The fibrous web is adhered to a dryer, for example, a Yankee dryer, and removed from the dryer using a flexible creping blade. The terms "creping blade", "crepe blade" and "doctor blade" are used interchangeably herein. The creping blade can be made of metal, ceramic, or other materials known in the art. The degree to which the web is adhered to the dryer is a factor in determining how effective the creping will be, and thus, the bulk, stretch, tensile strength and softness of the creped web. Creping increases the softness of the paper by forming the creped structure, breaking a significant number of inter-fiber bonds, and exposing fiber ends from the surface of the sheet. The creped structure is characterized by crepe ridges and crepe troughs which are generally oriented with the long dimension perpendicular to the machine direction; the direction of travel of the sheet. The size, shape and spatial frequency of these ridges impact the bulk of the sheet. The creped structure results in the paper being mechanically foreshortened in the machine direction which enhances bulk and stretch, as well as softness. Individual producers determine the specifications for the bulk, stretch, tensile strength and softness of the creped web based on the product being produced and the requirements of their customers.

To form a high-quality crepe paper, the adhesion and strip ability of the fiber web onto and from the heated cylindrical dryer are important, and the degrees thereof greatly influences the creped structure of the sheet. The degree of strip ability is controlled by the properties of the sheet, the composition of the material that is used to adhere the wet sheet to the Yankee, the setup of the crepe blade, the temperature of the Yankee and other factors known to those skilled in the art.

Once the wet fibrous web on the Yankee cylinder surface is dried, the dried fiber web or crepe paper is "creped off" from the Yankee cylinder surface using a doctor blade. The adhesion should be enough to generate a good crepe structure that will provide the desired "hand-feel", bulk, stretch and tensile strength properties to the final paper product. However, the adhesion should not be so much that it will hinder the paper web from being "scraped off" the Yankee cylinder by the doctor blade.

Creped structured sheets are a variation on creped sheets and are well known to those skilled in the art. The Through Air Drying (TAD) process was the original process for creating creped structured sheets. Currently, other processes are in use, including the NTT process developed by Valmet and the ATMOS process developed by Voith. Creped structured sheets have a specific three-dimensional structure imposed on the sheet shortly after initial forming and prior to being applied to the Yankee dryer. At this stage in the manufacturing process the sheet contains a significant amount of water both in the fibers that make up the sheet and in the interstitial regions between the fibers, as a result the sheet is particularly amenable to mechanical deformation. Typically, the process uses either a vacuum and/or a mechanical action to force the sheet onto a fabric, the surface of which has a designed three-dimensional structure, the structure has a specific pattern, is generally proprietary and is designed for the specific product being produced. The sheet is embedded in the fabric and takes on a mirror image of the three-dimensional structure of the fabric. After the structure is imposed on the sheet, the sheet is partially dewatered using thermal and/or mechanical methods. It is then transferred to the Yankee dryer, fully dried, and then creped. The crepe ridge and trough structure resulting from the creping process is superimposed on the previously imposed designed three-dimensional structure. In the case of a creped structured sheet both the imposed three-dimensional structure and the crepe ridge and trough structures determine the sheets properties, e.g., bulk, stretch, tensile and softness. The current method is particularly well suited to monitoring both the crepe ridge and trough structure as well as the imposed three-dimensional structure. The imposed three-dimensional structure is of the same scale or larger scale as the crepe ridges and toughs, and has a regular pattern that is more easily evaluated.

The structure of a tissue or towel sheet, both the crepe structure and any structure imposed by a structured sheet process, is one of the primary factors controlling the properties of the final product in creped sheet manufacturing. If the crepe structure of the sheet can be monitored and characterized in real time via an on-line machine sensor, the tissue maker can adjust or monitor process variables such as crepe blade vibration, crepe blade wear, Yankee adhesive coating composition, Yankee adhesive coating amount, Yankee temperature, hot air hood impingement, fiber refining, and chemical addition prior to the Yankee (debonder, softener, strength), to insure production of the desired product. While a number of on-line crepe monitoring systems have been proposed, none of the techniques treat the sheet as a multi-dimensional data source. Nor, do current techniques examine the edge of the sheet in which such an examination can provide important information on crepe structure, including sheet bulk, sheet internal disruption, and free fiber ends.

Current techniques cover a range of imaging methods and data analysis techniques that use a variety of illumination sources, imaging techniques, and analysis methods. Various techniques are used to evaluate crepe paper wherein the angle of the crepe ridges and the cross directional length of the crepe ridges are measured. Other techniques are used to characterize the crepe ridges, such as, crepe fold pitch, distribution of crepe folds, orientation angles and machine direction spatial frequency of linear crepe folds. However, none of the current methods treat the crepe ridges and troughs and any imposed structure as three-dimensional structures with complex geometrical characteristics that vary in both the machine-direction (MD) and cross-direction (CD) and as well as in the out-of-plane direction, nor do they treat the image of the sheet as a multi-dimensional information source.

Current methods of evaluating creped sheets do not consider that the sheet consists of three-dimensional structures, both crepe ridge and trough structures as well as designed three-dimensional structures imposed on the sheet by the structured sheet process, nor that the combined structures can also be used as a multi-dimensional data source. The new method treats the image as a multi-dimensional information source. In the plane of the sheet, the crepe ridges and troughs form irregular two-dimensional features in an image that are characterized using various geometric equations and both the spatial and temporal variations in those metrics. These metrics are also used to characterize the three-dimensional structures imposed by the structured sheet process and the spatial and temporal variations in those structures. The brightness variations in the image provide indirect information on crepe height, trough depth and the out of plane variations created by the structured sheet process; these variations are characterized based on intensity, spatial location and temporal variations. Since the image is treated as a multi-dimensional information source, two-dimensional spectral analysis methods are applied and used to identify crepe structure features based on the scale and frequency of occurrence of those features. The temporal variations in these measures provide the capability to monitor and control machine operation.

The current method can also be applied to the edge of the sheet, wherein an image of the edge of the sheet presents two-dimensional features in the MD and in the thickness or out-of-plane direction of the sheet. Crepe ridges, crepe troughs, disrupted regions and fiber ends form irregular two-dimensional features in the image that are characterized by various geometric measures and both the spatial and temporal variations in those measures. In the case of the edge image, brightness variations in the image indicate differences between dense and less dense regions; the variations are characterized based on intensity, spatial location and temporal variations. The edge image also provides bulk information. Two-dimensional spectral analysis methods are applied and used to identify crepe structure features based on the scale and frequency of occurrence of the features. As with the surface images, the temporal variations in these measures provide the capability to monitor and control machine operation.

SUMMARY

The current method provides for the on-line characterization of paper or paper products, such as tissue or other crepe paper products. More specifically, an imaging sensor or source generates a signal wherein an image can be obtained of the paper products topographical or surface area or region.

The imaging or photographic sensors generate a signal defining one or more images from which one or more devices and metrics can be used to derive various information about the formation of the creped sheet.

The current method also includes obtaining an image of an edge area or region of the creped sheet and in a similar manner to that used for evaluating a surface area or region of the creped sheet. The one or more signals from the one or more sensors are converted to one or more images. The images are evaluated using one or more metrics.

The combination of surface and edge region two-dimensional spectral analysis provides a multi-dimensional characterization of the creped sheet structure, which is an additional innovative and unique application of the method.

BRIEF DESCRIPTION OF THE DRAWINGS

The present invention will hereinafter be described in conjunction with the following drawing figures, wherein like numerals denote like elements.

DETAILED DESCRIPTION

Figure 1:
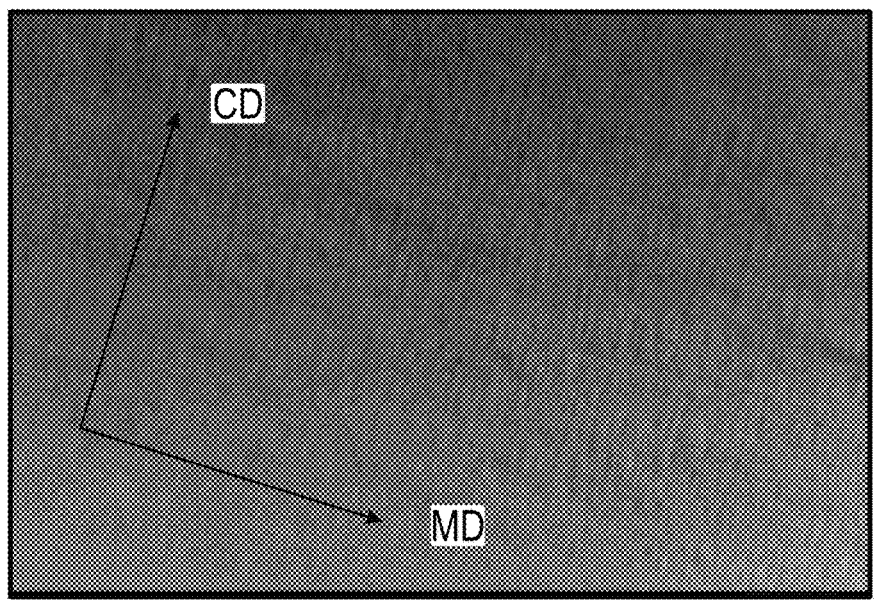
FIG. 1, initial image of a surface region of a creped sheet structure.

The following detailed description is merely exemplary in nature and is not intended to limit the invention or the application and uses of the invention. Furthermore, there is no intention to be bound by any theory presented in the preceding background of the invention or the following detailed description.

Provided is a method of characterizing creped sheet structures wherein an imaging system including one or more sensors capable of generating a signal that represents a surface or topographical area or region or an edge area or region of the creped sheet structure. The signal(s) is converted into one or more images and the one or more images evaluated using one or more metrics.

In some aspects of the method, the one or more sensors can be an imaging or photographic sensor, wherein the signal that defines the area or region is displayed as an image.

In some aspects of the method, various metrics can be used to evaluate the images that are generated of the area or region of the creped sheet structure. The metrics are used on both the crepe ridge and trough structure as well as the imposed three-dimensional structure of a structured creped sheet. These metrics can give vital information including crepe ridge characteristics, crepe trough characteristics, characterization of the imposed three dimensional structure, sheet bulk, sheet internal disruptions, and free fiber ends.

By the area or region of the creped sheet structure that is imaged, it is meant that one or more images of an upper surface, lower surface, and/or edge region of the creped sheet structure is generated. The creped sheet structure is typically imaged during the production process and after the sheet has been creped from the Yankee dryer. While the imaging can be performed on a sheet after the production process has occurred, it is most beneficial to perform the imaging as the creped sheet is released from the Yankee dryer in order to optimize the production process in real time. The imaging system can include one or more sensors capable of generating a signal that can be converted to an image or a photographic or imaging device that can provide clear imaging of the area or region of the formed creped sheet being evaluated. In the current application, the term creped sheet structure and formed creped sheet are used interchangeably herein.

The creped sheet structure is defined by the crepe ridges, crepe troughs, sheet internal disruptions, exposed free fiber ends and/or an imposed three-dimensional structure in the formed creped sheet; these defined structures dictate the final properties of the creped sheet including softness, tensile strength, stretch and bulk. Therefore, since the generated image is of a moving sheet, the sensors or imaging device or system must be such that a clear image of the region of the formed crepe sheet is obtained.

In some aspects of the current method, obtaining images with an imaging or photographic device having the required clarity, requires a lens with the appropriate depth of field to obtain a focused image despite small motions of the sheet towards or away from the imaging device. The process required for selecting the appropriate lens system is well known to those skilled in the art. The crepe ridge and trough structure and/or the imposed three-dimensional structure of a creped structured sheet, provide the basis for a Cartesian coordinate system based on the MD and CD. Therefore, it is not required that the imaging system be oriented such that the images vertical and horizontal axes are aligned with the MD and CD.

In some aspects of the current method, geometric techniques are used to transform between the MC/CD coordinate system of the creped sheet structure and the coordinate system based on the vertical and horizontal axes of the generated image. Coordinate system rotation is a well known geometric technique and there are various imaging analysis software packages available to perform these operations automatically.

In some aspects of the current method, an imaging or photographic device is used to generate an image. Given that the creped paper can be travelling at speeds in excess of 1500 meters per second (m/sec), image clarity requires that the imaging or photographic device has shutter speeds on the order of 0.5-5 microseconds (µs). Shutter speeds of this duration require particularly intense light sources. In some applications halogen light sources could be used to provide the needed light intensity. However, halogen and similar type lights produce a considerable amount of heat, which near a tissue or towel product represents a potential fire hazard. An alternative light source is a high intensity LED. This type of source is more efficient at producing light and does not produce an excessive amount of heat. Veritas of Tallahassee, Fla. is one manufacturer of LED systems for high speed imaging.

The image of the creped sheet structure provides a contrast between the crepe ridges, which appear lighter in color/shading, and crepe troughs, which appear darker in color/shading, regardless of the orientation of the light source relative to the surface of the sheet. A similar effect is created by the imposed three-dimensional structure of a creped structured sheet. In any particular application, there may be orientations of the light source relative to the creped sheet that enhance the contrast. The methods and metrics used to identify those orientations and the required light intensity are known to those skilled in imaging tasks. Digital camera systems are commercially available that can take images at frequencies in excess of 10,000 frames/sec with shutter speeds of 0.5-5 µs. Photron USA, Inc. of San Diego, Calif., is an example of one supplier of such imaging systems. Systems of this type require extensive data storage capabilities due to the number of images taken. The greater the image frequency and the greater the data storage capacity the greater the cost of the overall system and the complexity of processing the stored data.

In some aspects of the current method, signals or images are taken at a frequency that allows for real time monitoring of the creping process. As an example, imaging frequency could be on the order of about one image every 10 seconds and still allow real time control of the machine operation. Any control action taken based on the image data will take longer than about 10 seconds to yield a change in operation of the process. This is due to the inherent lag time of a tissue or towel machine. The minimum required frequency of image acquisition depends on the application as no two tissue or towel machines operate in the same manner.

In some aspects of the method, a surface or topographical region of the creped sheet structure is imaged. The surface can be an upper or lower surface of the creped sheet structure in which a two-dimensional spectral analysis tool can be used to determine the scale and frequency of occurrence of the features that make up the crepe structure and/or the imposed three-dimensional structure of a creped structured sheet. In the manufacture of any paper product considerable effort is expended to make the structure of the sheet as uniform as possible. However, all paper products are made up of individual fibers which have physical and chemical properties that vary from fiber to fiber. As a result, the sheet will have a spatial variability in its properties, which in turn results in spatial variability in the crepe and trough structures. This variability spans a range of dimensions, from that of individual fibers to scales larger than that of the crepe ridges and troughs. Some of the variability is random and some is not random.

The sheet surface images show variations of the crepe and trough structures and/or of the imposed three-dimensional structure of a creped structured sheet in both the MD and CD directions. These structures have features that span a range of dimensions and frequency of occurrence. The sheet edge images show variations of the sheet density due to sheet disruptions and free fiber ends in both the MD and the out-of-plane directions. As with the sheet surface images, these structures have features that span a range of dimensions and frequency of occurrence. Both types of images can be analyzed using a two-dimensional spectral analysis tool. This type of tool takes an image from the spatial domain, i.e., a standard digital image and transforms it into the frequency domain. All the information contained in the original image is maintained but is present in terms of frequency and magnitude or scale. Two-dimensional spectral analysis tools provide the ability to simultaneously characterize the scale and frequency of occurrence of the features of the crepe structure in two-dimensions. One spectral analysis tool is the Fast Fourier Transform (FFT). Other spectral analysis techniques include Wavelet transforms, Hartley transforms, and Wigner-Ville transforms. These spectral decomposition techniques and the implementation of the techniques are standard methods in the fields of signal processing and image analysis. Selection of the most suitable method is based on the image data content, available computing capabilities and ease of implementation. The FFT method is included in many exiting image analysis packages. One example is ImageJ, a public domain, Java-based image processing program developed at the National Institutes of Health. An example of a commercially available image processing package that includes the FFT method is the Aphelion™ Image Software Suite available from Amrinex Applied Imaging, Inc., of Monroe Township, N.J.

In some aspects of the current method, spectral analysis methods are used to quantify the scale and frequency of the non-random variations of the creped sheet structure or structured crepe sheet structure. The non-random variations can be used to characterize the sheet and to identify temporal and spatial changes in the sheet structure. Significant variation in CD crepe structure indicates a non-uniformly formed and/or non-uniformly dried sheet. When the variability is on a scale comparable to a significant portion of the machine width, the result is reduced converting efficiency. Rolls cut from one width section will have different properties than rolls cut from a different width section requiring the converting equipment to be adjusted accordingly. When the variation is on a scale comparable to a portion of the width of the final product the result is a product that is not perceived to be soft and/or a product that does not perform its intended function. Significant variations in MD structure indicates a machine which is not well controlled; the operation of one or more machine elements is changing with time. Monitoring of the sheet quality requires characterizing the MD and CD properties of the crepe ridges and troughs as well as the frequency of occurrence, spatially and temporally, in both the MD and CD. Analyzing the sheet in only the MD or CD directions yields an incomplete characterization of the sheet. Thus, the imaged area or region of the formed creped sheet is evaluated using a two-dimensional spectral analysis tool.

In other aspects of the current method, an image of the edge region of the creped sheet structure is evaluated. The edge region images show variations in the creped sheet structure through the thickness of the sheet, such as, bulk variations, density variations, and variations in free fiber occurrence. Considerable effort is expended in the manufacturing process to maintain consistent out of plane sheet characteristics. However, the properties of the fibers making up the sheet and the variation in every manufacturing process, results in a sheet with spatial variability in its properties, which in turn results in spatial variability in the crepe and trough structures, which in the out of plane direction results in variability in bulk, density and free fiber occurrence. Some of the variability is random and some is not random. A spectral analysis quantifies the scale and frequency of the non-random variations. The non-random variations can be used to characterize the sheet and to identify temporal and spatial changes in the sheet structure.

In yet other aspects of the current method, the two-dimensional spectral analysis method can be used as an image filter. This is done by first converting the image to the frequency domain using a tool such as Fast Fourier Transform (FFT). The features that occur over a specific frequency range or scale range are then eliminated from the frequency domain. The final step is to perform an inverse transformation and return the image to the original spatial domain. The result is an image in the time domain that is similar to the original image but lacks the features removed in the frequency domain. The two images can then be compared using any of the techniques described here and the differences quantified.

The current method can be used to quantify small features such as free fiber ends, sheet disruptions, which are sometimes referred to as "micro crepes" that are incorporated into the crepe ridge and/or crepe trough structures small variations in the imposed three-dimensional structure of a creped structured sheet. While the technique has been applied in one dimension, along the MD, the innovation here is to recognize the multi-dimensional nature of the crepe structure and apply a two- or three-dimensional analysis to fully characterize the creped sheet structure. Following the concept of two-dimensional analysis this technique is equally applicable to evaluating the images generated of the edge areas or regions of the creped sheet structure. The current method provides for a combination of surface and edge region two-dimensional spectral analysis, which provides a multi-dimensional characterization of the creped sheet structure, which is an additional innovative and unique application of the method.

When the creped sheet is treated as a multi-dimensional data source a more complete description of the crepe structures can be obtained. The data can be used in one or more metrics described herein to characterize the crepe structures of the formed creped sheet. In a generated image of an area or region of the creped sheet surface or edge, there are regions that appear lighter and regions that appear darker. The lighter regions are crepe ridges and are lighter as more of the incident light is reflected towards the imaging device; the light intensity is greater. The darker regions are crepe troughs, and are darker as a lesser portion of the incident light is reflected towards the imaging device; the light intensity is less. In the case of structured creped sheet, a similar effect occurs, elements closest to the illumination source appear lighter and elements further from the illumination source, those features embedded in the surface appear darker. The imposed three-dimensional structure of the formed creped sheet can be considered as a geometrically uniform version of the crepe and trough structure, and can be evaluated and characterized using the same methods.

In a digital image the relative lightness and/or darkness is represented by the pixel values for each of the pixels making up the image. Therefore, the pixel value provides an indirect measure of the elevation of the elements making up the crepe structure. The light and dark regions form geometrically definable shapes. Quantifying these shapes based on metrics associated with area, perimeter, length, width, relative variation from a symmetric or regular shape, spatial separation between the shapes and spatial frequency of occurrence of shapes and shape features, makes it possible to characterize the structure of the creped sheet in an image.

Images taken at different times at the same CD location on the sheet can be used to characterize the temporal variation of the ridges and trough regions and/or the imposed three-dimensional structure regions of a creped structured sheet, in terms of relative changes, the frequency of change and the rate of change. In addition to shapes of the crepe ridges and crepe troughs and/or the imposed three-dimensional structure of a creped structured sheet, the light intensity in each region, the light intensity between regions, and the variation in light between similar regions can be used to characterize the vertical distribution of crepe ridges and crepe troughs and/or the imposed three-dimensional structure of a creped structured sheet. Images taken at different times at the same CD location on the sheet can be used to characterize the temporal variation in the vertical distribution of crepe ridges and crepe troughs and/or the imposed three-dimensional structure of a creped structured sheet, in terms of relative changes, the frequency of change and the rate of change. An additional method of characterization is provided by making use of two-dimension spectral analysis techniques. The spectral analysis simultaneously considers and quantifies by scale and frequency the structural variations in both the CD and MD. The obtained information is used in the real-time adjustment of a paper making process and making better quality paper products especially in the manufacture of tissue paper, towel or other products in crepe paper.

In other aspects of the current method, an image of the edge region of the creped sheet structure is evaluated. The edge region images show variations in the creped sheet structure through the thickness of the sheet, such as, bulk variations, density variations, and variations in free fiber occurrence. The surface of the sheet that was against the Yankee tends to show a greater number of elongated darker regions. These are fibers or groups of fibers that were pulled from the surface of the sheet during the creping process. As with the surface image, the light and dark regions are geometrically definable shapes. Quantifying these shapes based on metrics associated with area, perimeter, length, width, relative variation from a symmetric or regular shape, spatial separation between the shapes and spatial frequency of occurrence of shapes and shape features, makes it possible to characterize the structure of the creped sheet in an image. Images taken at different times can be used to characterize the temporal variation of the denser and less dense regions, in terms of relative changes, the frequency of change and the rate of change. In addition to shapes of the crepe ridges and crepe troughs, the light intensity in each region, the light intensity between regions, and the variation in light between similar regions can be used to characterize the bulk, areas of disruption and free fiber ends. Images taken at different times can be used to characterize the temporal variation in these characteristics in terms of relative changes, the frequency of change and the rate of change, which spectral analysis simultaneously considers and quantifies by scale and frequency structural variations in both the MD and out of plane directions.

In some aspects of the current method, imaging processing techniques such as contour mapping can be used to highlight the crepe structure and/or the imposed three-dimensional structure of a creped structured sheet and to draw closed contours around the crepe ridge regions or regions of the imposed three-dimensional structure of a creped structured sheet. The concept of a closed contour is similar to that of constant elevation contours in a topographical map. Contours are drawn on the image based on pixel values in the image, with the contour lines connecting pixels with the same numerical pixel value. Since the pixels values in the image of a creped sheet indirectly correspond to local height, the resultant contour lines outline the crepe ridges. The contours define the shape and the size of the crepe ridges and the shape and size of the associated crepe troughs. By varying the pixel value for which the contours are drawn the change in slope of the crepe ridges can be characterized. The slope of the crepe ridge is the change in pixel value divided by the number of pixels between the contours being considered. If the distance between the imaging device and the sheet is known, or if a calibration image is available, a physical distance can be associated with the number of pixels between the contour lines. Such techniques are standard and well known in the image analysis field.

In yet other aspects of the current method, a surface or topographical region of the formed creped sheet is imaged in the machine direction (MD) and cross direction (CD), which images are then evaluated such that closed contours are drawn around the crepe ridges, defining both the crepe ridges and the crepe troughs. The closed contours, as outlines of the crepe ridge structure, will generally be oblong in shape and be oriented with the larger dimension parallel to the cross direction and the shorter dimension parallel to the machine direction. Due to the variation in both the sheet structure and in the manufacturing process the closed contours will show a range of shapes and sizes. In addition, changes in the manufacturing process will result in changes to the crepe structure which will in turn result in changes to both the shape and size of the closed contours as well as the relative distribution of those shapes and sizes. Depending on the product being made there will be trends in both shape and size of the crepe ridges and crepe troughs, these trends can be correlated with creped sheet properties such as softness, stretch, tensile strength and bulk. There are a number of geometric measures that can be applied to characterize the shapes of the crepe ridges. In the case of creped structured sheets, the same techniques are used to draw closed contours around the lighter regions in the imposed three-dimensional structure of a creped structured sheet, thus providing the ability to characterize the structure. While the imposed structure is intended to be uniform both temporally and spatially the above-mentioned variations in the manufacturing process result in structure changes that can be characterized and correlated with sheet properties such as softness, stretch, tensile strength and bulk.

In one aspect of the current method, the metrics used to evaluate the generated images are related to the concept of aspect ratio. Aspect ratio metric is generally defined with respect to regular shapes such as rectangles and ellipses and is simply the long dimension divided by the orthogonal short dimension. It is a simple metric that is used to relate the dimensions of a shape in two orthogonal directions. This metric is particularly applicable in evaluating the surface or topographical area or region of the formed creped sheet, to determine the variation in the MD and CD dimensions of crepe ridges and crepe troughs. A long thin shape will have a higher aspect ratio than a short thick shape. In the case of a creped sheet low aspect ratio and high aspect ratio shapes are not likely to be perceived as soft and depending on the relative separation of the ridges may have poor stretch and strength properties. Low aspect ratio ridges will be more widely separated in the machine direction even in a closely packed configuration. As a result, the crepe ridges will be more likely to be perceived as separate structures which detracts from the perception of softness. In the case of high aspect ratio shapes this may indicate ridges with sharp edged peaks, which again detracts from the perception of softness. This is exacerbated if the crepe ridges are more widely separated. Both the elongation of the crepe ridges and the number of ridges per unit area and/or per unit length in both the MD and CD are factors in controlling the final sheet properties.

In some aspects of the current method, given that crepe ridges are not simple ellipses, a modified form of aspect ratio is used in characterizing the crepe ridge structure rather than the standard form of aspect ratio. As noted above, the standard from of aspect ratio is largest dimension/orthogonal small dimension. If the sensor or imaging device of the imaging system remains at a relatively constant distance from the surface being imaged, the number of pixels in either the MD or CD can be used as a surrogate for physical dimensions in the MD or CD. The standard definition of aspect ratio can be modified to accommodate non-symmetrical shapes by using the definition average length/average width. In this case average length is the average of length of the lines of pixels in the CD and the average width is the average length of pixels in the MD. A further modification of the aspect ratio metric is the elongation shape factor, $$F_{elongation}=(I_{CD}/I_{MD})^{1/2}$$

where $I_{CD}$ and $I_{MD}$ are the second moment of inertia in the MD and CD respectively, and where the second moment of inertia is defined as $$I_x = \iint x^2 dx dy$$

The metric requires additional calculations but potentially better quantifies the relationship between the MD and CD dimensions of crepe ridges.

In yet other aspects of the current method, a number of metrics are used to address the relationship between the length and width of the shape of the crepe ridges and troughs. The metrics compare one or both dimensions to either the area or perimeter of the shape. The simplest of these metrics treat the MD and CD separately and include i) closed contour perimeter/maximum CD dimension; ii) closed contour perimeter/maximum MD dimension; iii) closed contour area/maximum CD dimension; and iv) closed contour area/maximum MD dimension. It is worth noting that i) divided by ii) or iii) divided by iv) yields an aspect ratio. One could divide i) by iv) or ii) by iii) to obtain a metric that is based on the ratio of perimeter to area multiplied by the ratio of the maximum CD dimension to the maximum MD dimension. A more computationally complex metric is the radius of gyration for either the MD or CD and is defined as $$R_{gyration-CD}=[I_{CD}/\text{Area}]^{1/2}$$

and $$R_{gyration-MD}=[I_{MD}/\text{Area}]^{1/2}.$$

These metrics will be closer to unity as the length or width dimension of the crepe ridges and troughs approaches the numerical value of the perimeter or area. The closer the measure is to unity, the less ellipse like is the shape, which is generally not desirable for crepe structures for the same reason a low aspect ratio is not desirable. A metric which addresses the same shape parameter, but considers both MD and CD dimension is compactness shape factor, $$F_{compactness}=\text{Area}/[2\pi(I_{MD}^2+I_{CD}^2)^{1/2}].$$

The isoperimetric quotient, $$Q=4\pi \text{ region area/region perimeter}^2$$

is an alternative measure of compactness. In general, increased compactness represents a more circular shape. This is not desirable for crepe ridge structure as it results in a condition similar to that for low aspect ratio shapes.

Crepe ridge shapes are generally envisioned as not having concave sections. Concave sections are evidence of non-uniformity in the crepe ridge structure which if wide spread amongst crepe ridges results in reduced softness, bulk, tensile and stretch.

In some aspects of the current method, imaging analysis techniques are used to determine the portion of the perimeter of a shape that is convex. This is termed the waviness factor and can be determined using the equation, $$F_{waviness}=P_{convex}/P$$

where $P_{convex}$ is the length of the perimeter with a convex shape and P is the total perimeter. A waviness factor of close to one being preferred.

In yet other aspects of the current method, the metric is a measure of the deviation from a circular or round shape. This can be determined using the equation, $$R=(1/N)\Sigma R_i$$

where R is a measurement from the center of the shape to the perimeter, N is the total number of measurements made in equal angle increments about the circumference of the shape and the summation is taken from 1 to N. The parameters a and b are then calculated $$a=(2/N)\Sigma R_i \cos \theta_i$$

$$b=(2/N)\Sigma R_i \sin \theta_i$$

where $\theta$ is the angular increment of the radial measurements and used in the expression $$\Delta=R_i-R-a\cos\theta_i-\sin\theta_i$$

where $\Delta$ is the deviation from roundness, which in the case of crepe ridges, should be maximized. Crepe ridges comprising round shapes would be perceived similarly to Braille.

All of the above described metrics can be applied to evaluating and characterizing the imposed three-dimensional structure of a creped structured sheet.

In other aspects of the method, an alternative to characterizing the shapes of the crepe ridge and crepe trough is to directly quantify the variation in light intensity in the crepe and trough regions, light intensity between crepe and trough regions, and the light intensity differences between regions of similar shapes.

In other aspects of the current method, following the application of geometric metrics to the crepe and trough regions and/or the quantification of light intensity for the regions, statistical tools can be applied to further characterize the creped sheet structure. Among the simplest of tools for characterizing crepe ridges and troughs are, for example, the average, median and standard deviations. In the case of the creped sheet where crepe ridges and troughs span a range of shapes and sizes, these types of tools describe the structure in an incomplete manner. A more complete description would be to quantify the distribution of the metric employed. A simple example is a histogram of the aspect ratio. It shows the range of aspect ratios as well as the relative frequency of occurrence.

The above described methods related to quantification of light intensity can also be applied to evaluating and characterizing the imposed three-dimensional structure of a creped structured sheet.

The same geometric measures and quantification of light intensity are applied to the images of the edge of the sheet. In the case of the edge of the sheet the oblong shape with long dimensions significantly greater than the short dimension are not possible due to the limited span of the out of plane dimension and generally would represent undesirable characteristics. Long oblong shapes would be due to large, sharp edged crepe ridges. Lower aspect ratio, but not round, shapes are more desirable for a sheet with the required bulk, stretch, tensile strength and softness.

EXAMPLES

The examples listed here are directed at characterizing crepe and trough structures, it should be obvious that given the more uniform structures created by the structured sheet process that the examples apply equally to crepe structured sheets. FIG. 1, illustrates an image of a sheet surface of a creped sheet moving at a typical tissue paper machine speed of around 1200 m/min. The image shows the bottom of the sheet, the side of the sheet that was adhered to the Yankee. As compared to the top surface of the sheet, this surface of the sheet has more rounded crepe ridges, less abrupt transitions between ridges and troughs and a greater tendency to exhibit exposed fiber ends. This image was obtained using a high speed digital camera at 1000 frames/second. The lens system had a depth of field that allowed the image to remain in focus despite typical variations in the separation distance between the sheet and the imaging system. The shutter speed was 2 □s. An LED lighting system was used to illuminate the surface of the sheet. In the image the crepe ridges are the lighter colored regions and the crepe troughs are the darker colored regions. The CD axis is generally parallel to the long dimension of the crepe ridges and the MD axis is generally perpendicular to the long dimension of the crepe ridges. These directions are indicated by the arrows superimposed on the image. The MD/CD coordinate system is not aligned with the vertical and horizontal axes of the image. Most currently available image analysis and image processing software packages incorporate techniques to rotate either the MD/CD coordinate system or the vertical/horizontal image axis coordinate system so that the two systems are aligned.

Figure 2:
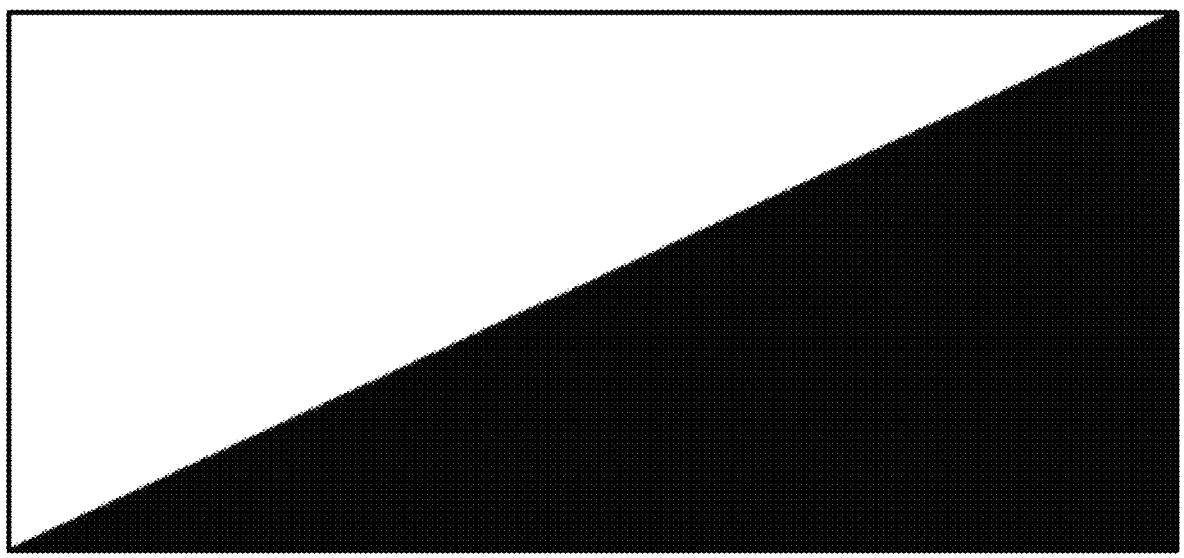
FIG. 2, image of the actual abrupt transition between two light intensity levels.
Figure 3:
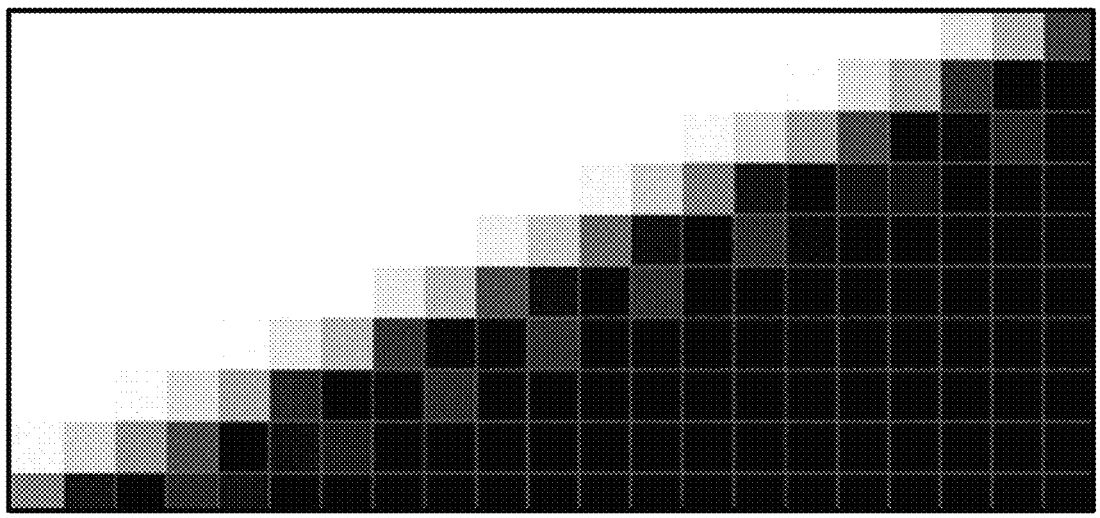
FIG. 3, digital representation of the image in FIG. 2 after applying an algorithm to the image.
Figure 4:
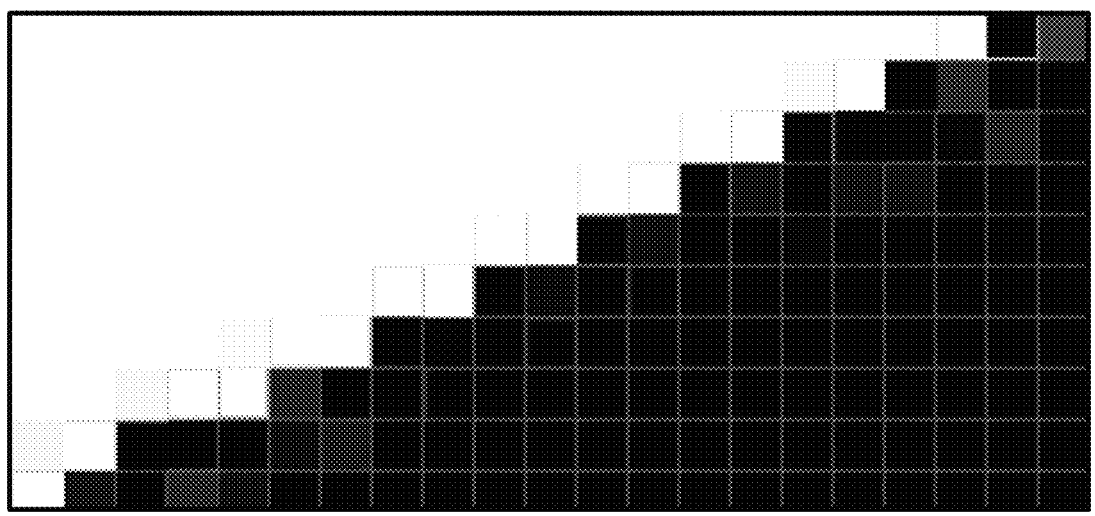
FIG. 4, digital representation of the sharpened image as relates to FIG. 3.
Figure 5:
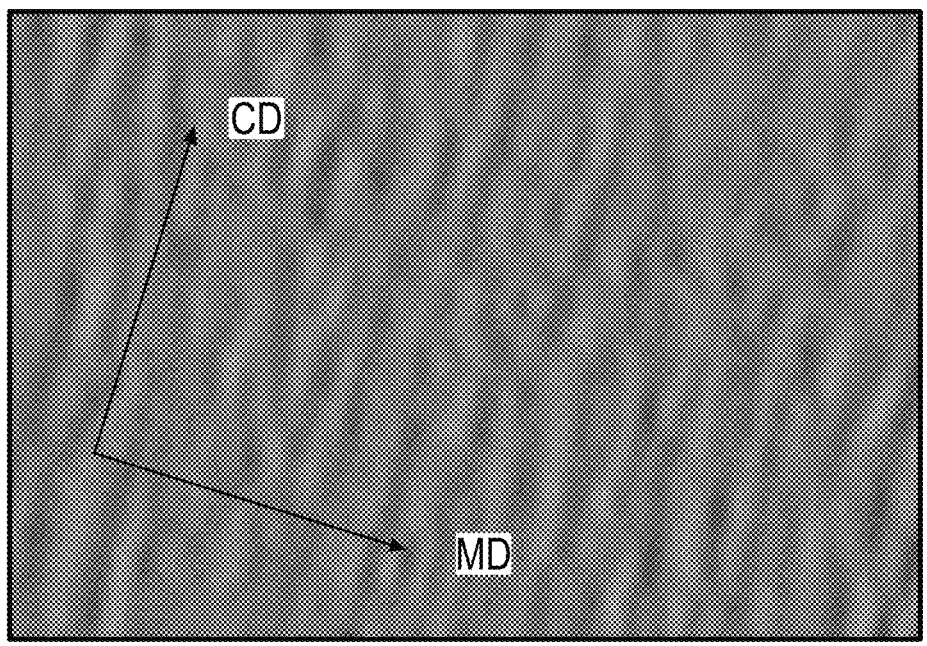
FIG. 5, the sharpened and zoomed in image of FIG. 1.

In examining the image, it is obvious that the crepe ridge and crepe trough structures have "fuzzy" edges and could appear in a clearer manner. This is inherent in digital imaging in which discrete pixels are used to construct the image. The actual location of a change in light intensity may occur across a pixel instead of at the boundary of a pixel. As a result, the pixel is "assigned" a value that represents a level of light intensity that is between the two. This can be addressed by applying an algorithm to sharpen the image; increase the observed contrast. An example is shown in FIGS. 2, 3 and 4. FIG. 2 represents an actual abrupt transition between two light intensity levels. FIG. 3 is the digital representation of that image. The transition line between the two light intensity levels cannot follow the pixel boundaries and as a result, pixels along the transition line have intermediate values. FIG. 4 shows the result of applying an algorithm to sharpen the image. Such algorithms are well known in the image analysis and image processing field and have been incorporated into virtually all software packages used to process digital images. FIG. 5, shows the image from FIG. 1 after an algorithm to sharpen the image has been applied and zoomed in.

Closed Contours Sheet Surface Region

Figure 6:
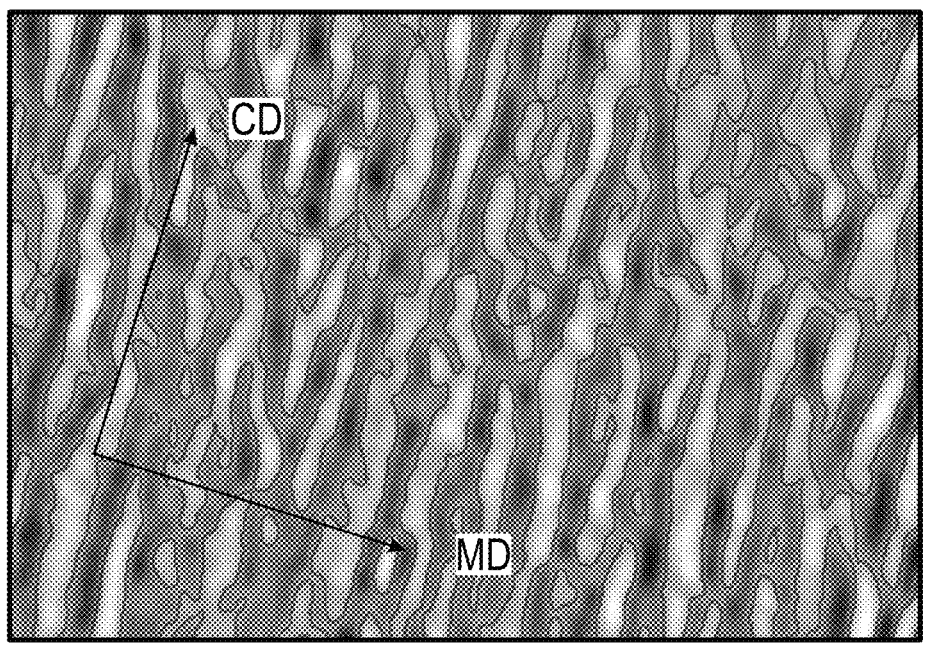
FIG. 6, the image of FIG. 5, with closed contours around the crepe ridge regions.

FIG. 6 shows the image in FIG. 5 with closed contour lines outlining the crepe ridge regions. The techniques used to identify the contour lines are well established in the image analysis and image processing field. These techniques involve applying numerical algorithms to the digital image in a manner like that used to sharpen the image. Note that the regions are generally oriented with the longer dimension in the CD direction, but are not uniform in shape or size. This is typical. The shape, size and relative spatial frequency of occurrence of the regions determines the quality of the sheet. This relationship changes with fiber composition, product type and other factors. The above described geometric measures are used to characterize the crepe and trough structures using consistent and quantifiable measures. It should be noted that by using the described metrics the multi-dimensional nature of the creped sheet structure is inherently being quantified and characterized. The variations in the metrics, both temporal and spatial, are then used to identify and quantify changes in machine operation and in sheet quality. Appropriate changes in machine operation can then be made to ensure that the sheet produced is of the desired quality.

Statistical Evaluations

Figure 7:
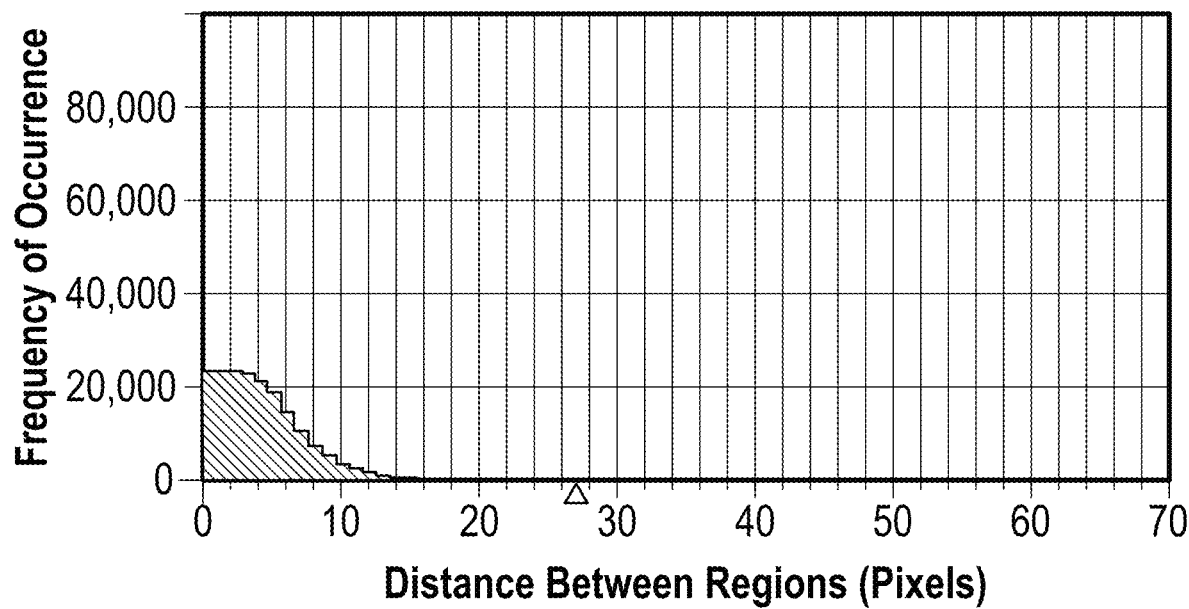
FIG. 7, histogram of distances between closed contours depicted in FIG. 6.
Figure 8:
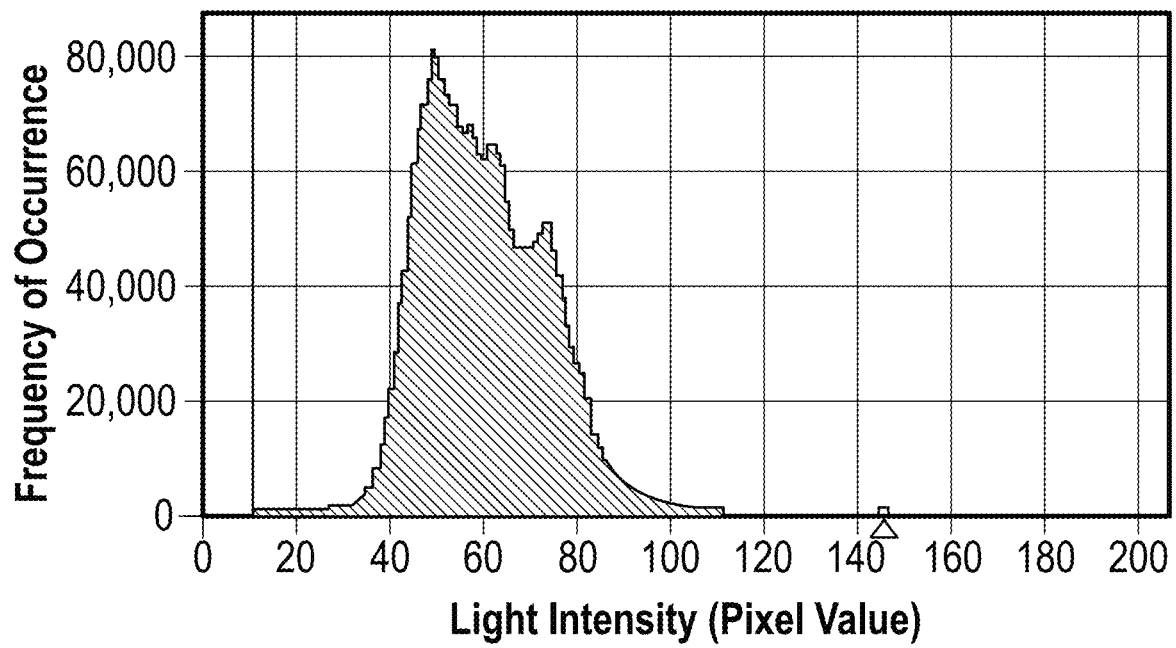
FIG. 8, histogram of light intensity between closed contours depicted in FIG. 6.

One method of monitoring changes in the metric used is to apply statistical tools, this enables quantifiable comparisons of both spatial and temporal variations and frequency of those variations. FIGS. 7 and 8 are examples of applying statistical tools such as the histogram. FIG. 7, shows the distribution of distances between the crepe ridge regions as defined by the closed contours. In this case, the distribution is compact indicating a consistent crepe ridge spatial distribution. FIG. 8, shows the distribution of light intensity for the regions defined by the closed contours. The figure shows a somewhat bimodal distribution which can be an indication of some non-uniformity in the crepe ridge shapes. In addition, histograms from different locations on the sheet or from different times can be compared, relative differences, the rate of change and periodic events can be identified and used to characterize changes the sheet structure. Any one of metrics or measurements mentioned above can be treated in a similar manner. The metrics will change with creping chemistry composition, sheet or coating moisture, coating contamination with fibers/fines, crepe blade wear, etc. Thus, correlations can be made between specific operating conditions and/or specific sheet quality measures and the information provided by the applied metric and the application of statistical tools to those metrics. The correlations can then be used to optimize machine operation and sheet quality. The most useful correlations will depend on the application.

Closed Contours Sheet Edge Region

Figure 9:
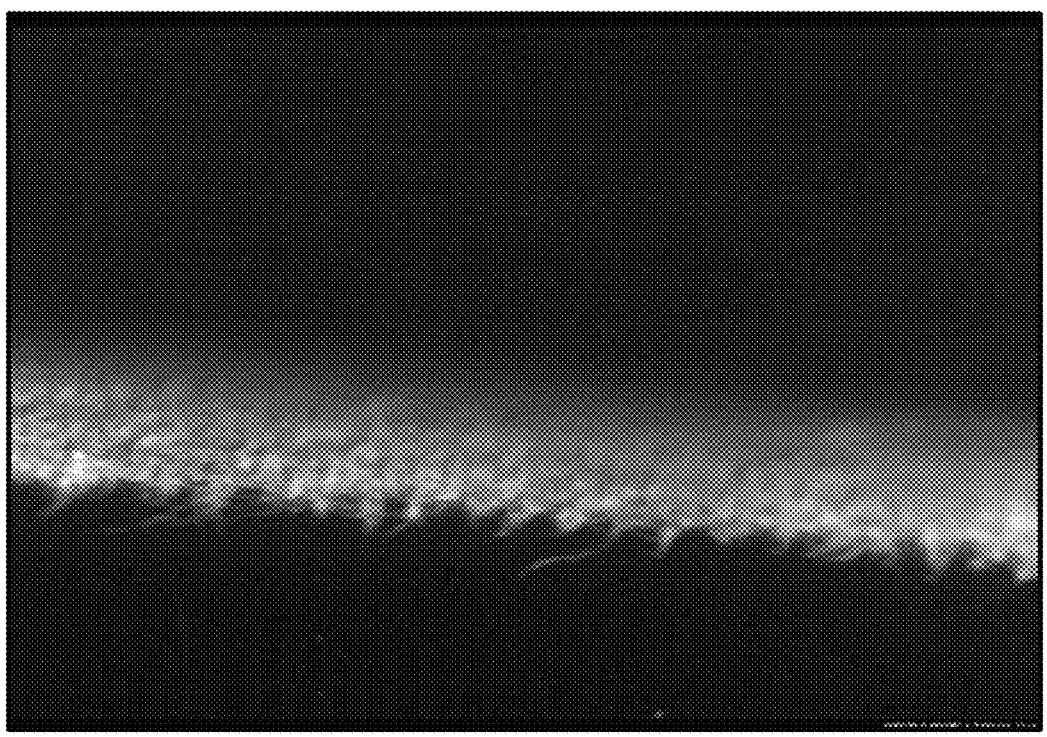
FIG. 9, Edge view of a creped sheet structure.
Figure 10:
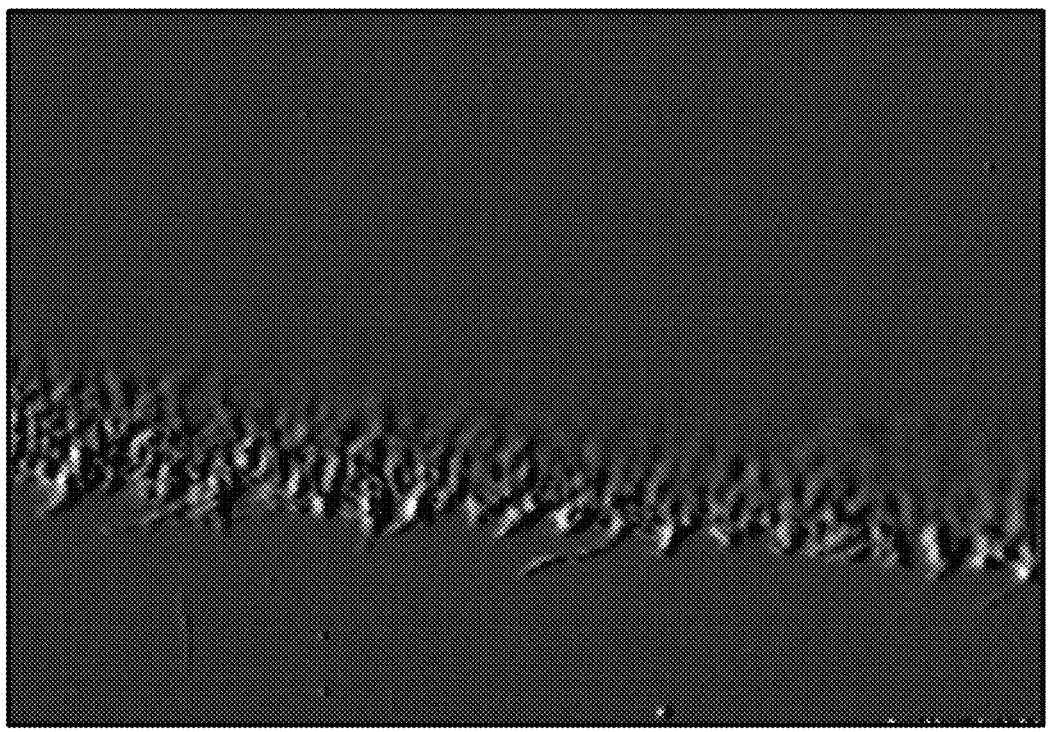
FIG. 10, the sharpened image of FIG. 9.
Figure 11:
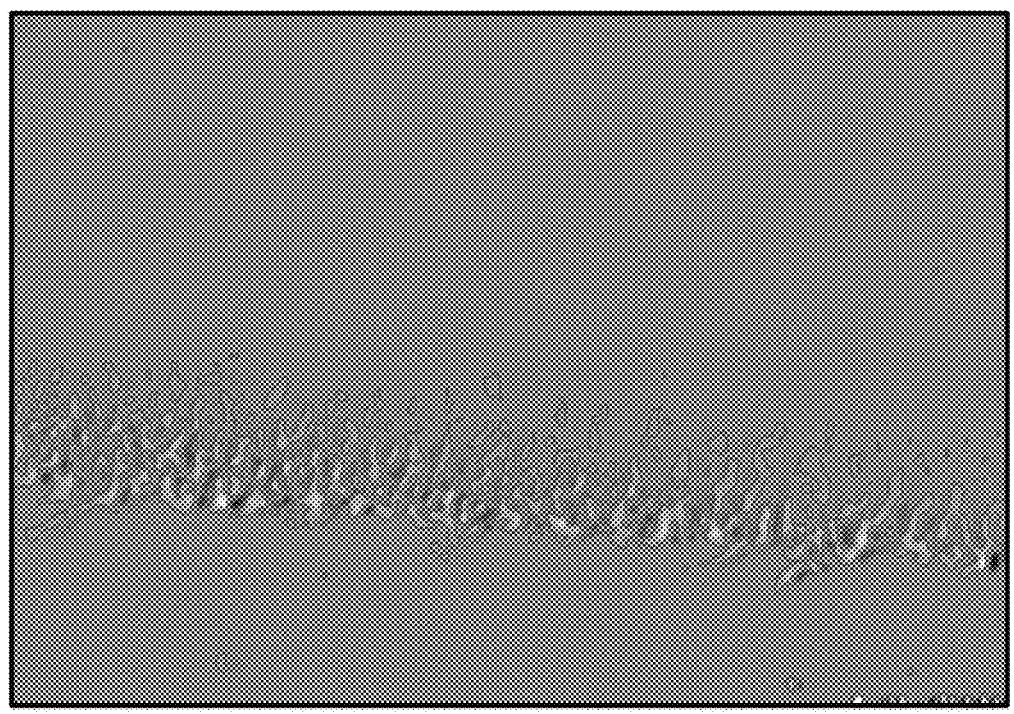
FIG. 11, the sharpened image of FIG. 10, with closed contours around the crepe ridge regions.
Figure 12:
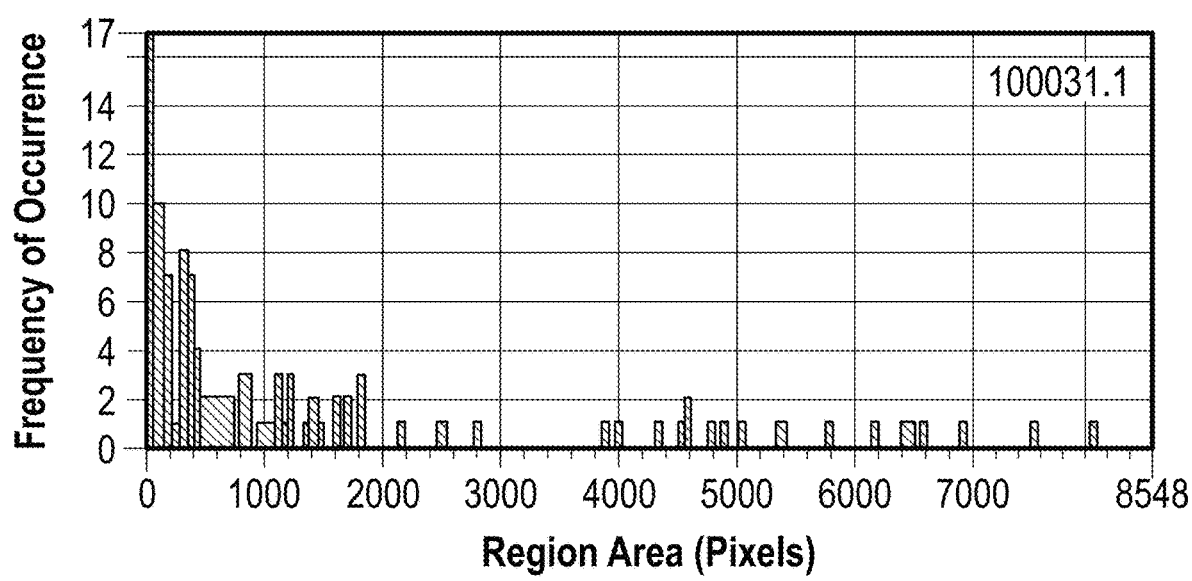
FIG. 12, Histogram of areas of closed contours in FIG. 11.

FIG. 9 shows an image of a sheet edge region. This image was obtained using the same imaging device and lighting as was used to obtain the image in FIG. 1. As with the surface region image a sharpening algorithm is applied to the original image to compensate for the pixel induced blurriness, providing an image with increased clarity and contrast. FIG. 10 shows the resultant image. FIG. 11 shows the same image with closed contour lines, the contour lines delineate denser and less dense regions of the sheet. Note that the larger, longer regions are generally oriented vertically. The relative frequency of occurrence, the distance between the regions and the total height of the ridges are associated with the bulk of the sheet. The contours can be described using average, mean and standard deviation, however as with the surface image this leads to an incomplete description of the structure.

Figure 13:
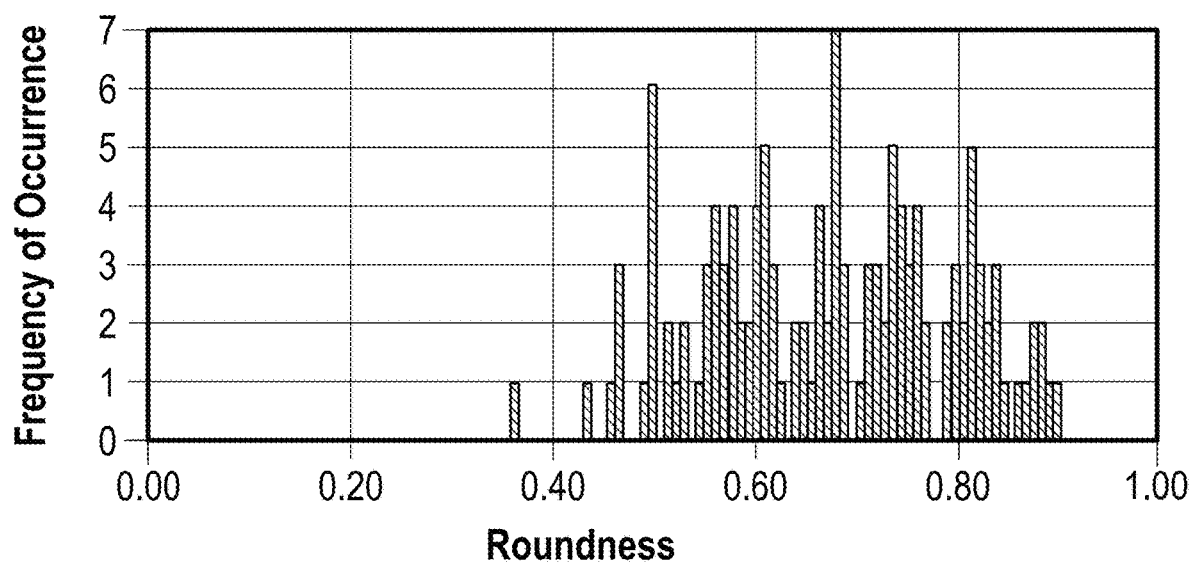
FIG. 13, Histogram of roundness of closed contours in FIG. 11.
Figure 14:
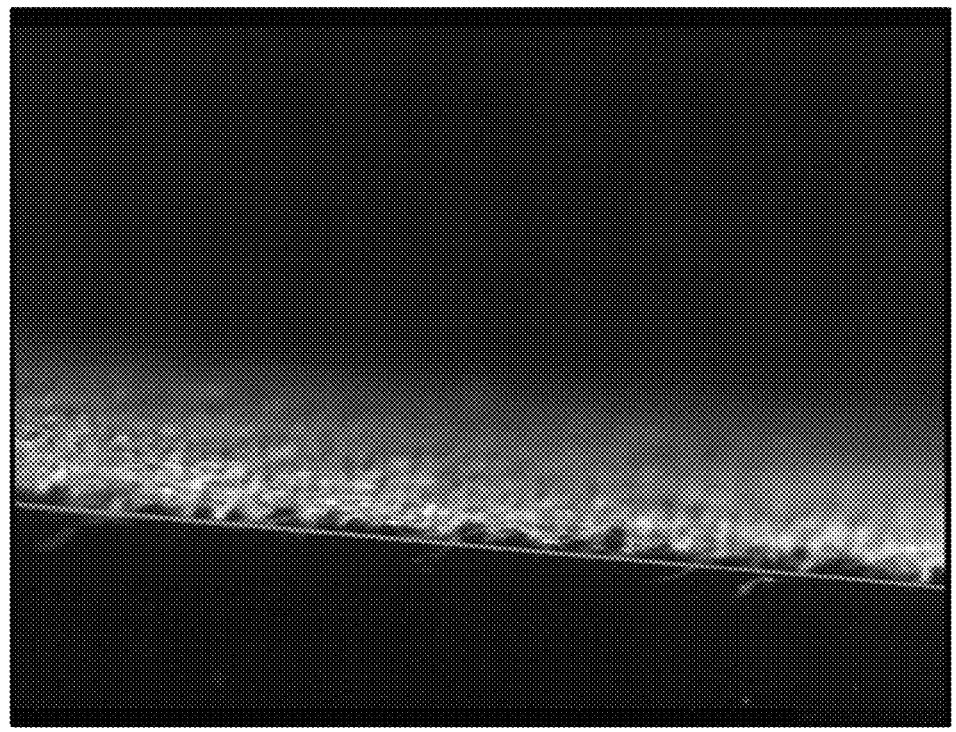
FIG. 14, An edge view of a creped sheet structure showing a reference line.

FIGS. 13 and 14 are additional examples of geometric measures being applied with the results being presented in the form of histograms. FIG. 13, shows the histogram for the areas contained within the closed contours. It can be seen that most of the regions are relatively small in area, but there are a considerably larger regions that have a low frequency of occurrence. These are potentially an indication of inconsistency in formation that would bear further investigation. FIG. 14 is a histogram of closed contour roundness. The histogram appears to indicate a reasonably smooth distribution, despite some gaps. This is a case in which variation over time could provide additional information on characteristics of the distribution. A possible additional measure would be the time average distribution.

Figure 15:
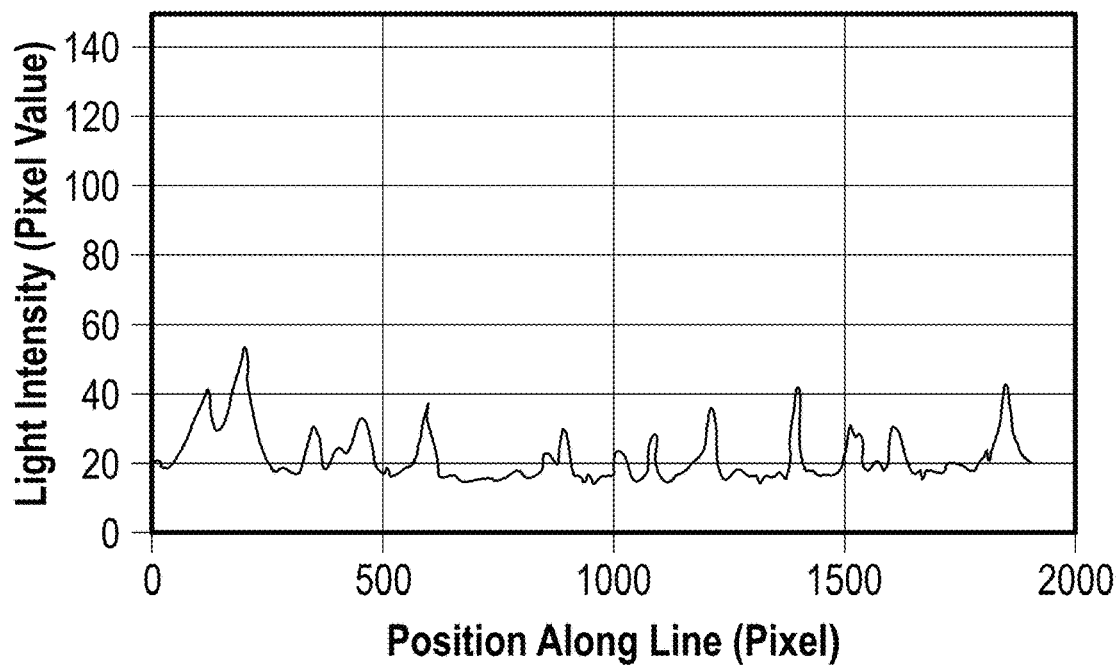
FIG. 15, Graph of light intensity along the reference line of FIG. 14.
Figure 16:
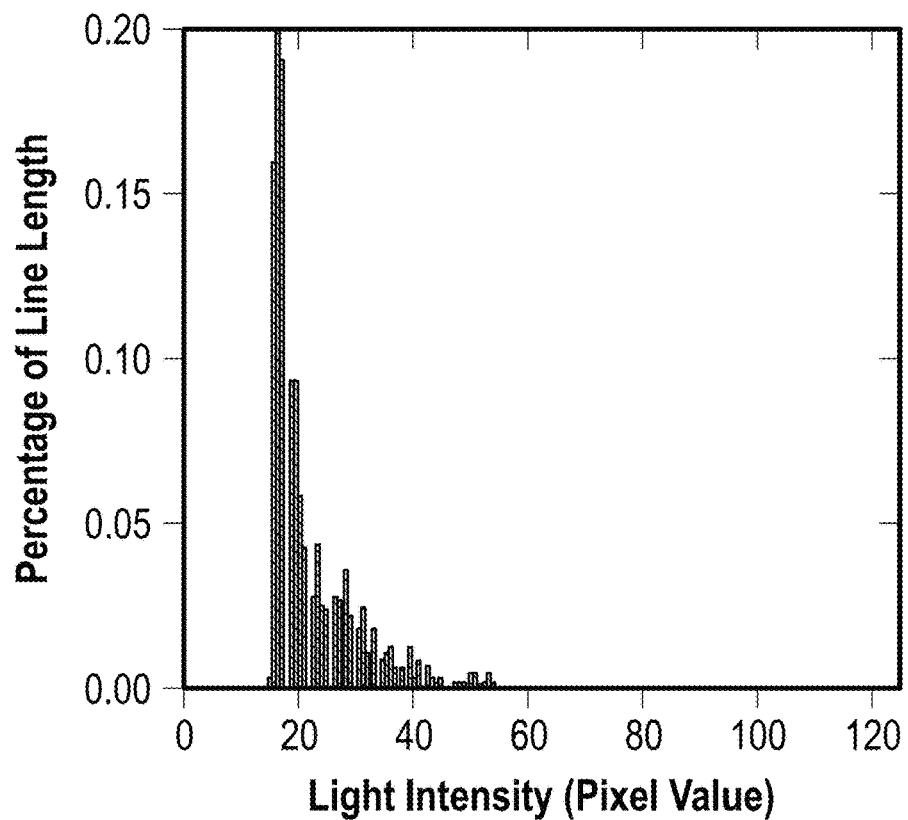
FIG. 16, Histogram of the light intensity along the reference line of FIG. 14.

In the case of the edge image a line can be superimposed on the image and measurement made relative to the line. FIG. 15 shows an example. The line can be position at different out of plane locations and the characteristics along the line measured. This can be done at multiple out of plane location making it possible to quantify changes through the thickness of the sheet. FIG. 15 shows light density along the line and FIG. 16 shows a the histogram for that measurement. Given that light density is an indicator of density, making this evaluation at multiple out of plane location enables a mapping of density through the thickness of the sheet, effectively providing a high resolution bulk measurement.

Example—Application of Spectral Decomposition

The sheet surface image provides spatial information in the MD and CD and the sheet edge image provides spatial information in the MD and out of plane direction. Thus, either type of image can be analyzed using a two-dimensional spectral analysis process. Two-dimensional spectral analysis methods quantify the spectral content of the image, the repeating features that make up the image. The most common method involves the use of the Fourier transform. In the case of digital images the FFT is used to implement the Fourier transformation. The process converts the image from the spatial domain to the frequency domain, all of the information in the original image is present in the transformed image.

Figure 17:
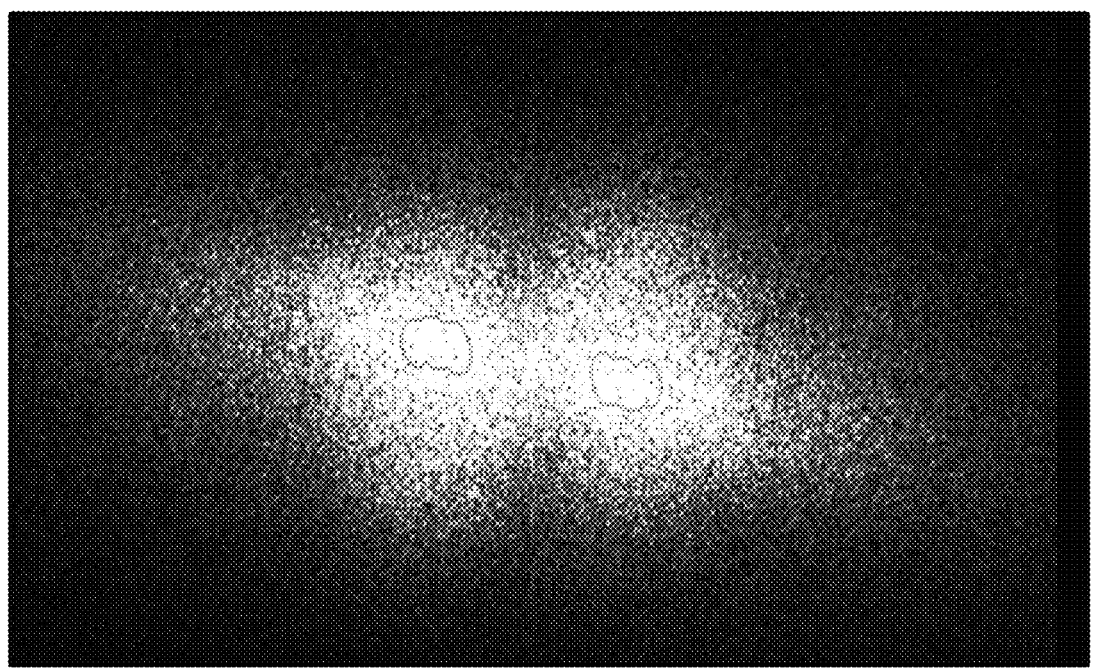
FIG. 17, Fast Fourier Transform (FFT) of sheet image og FIG. 5.
Figure 18:
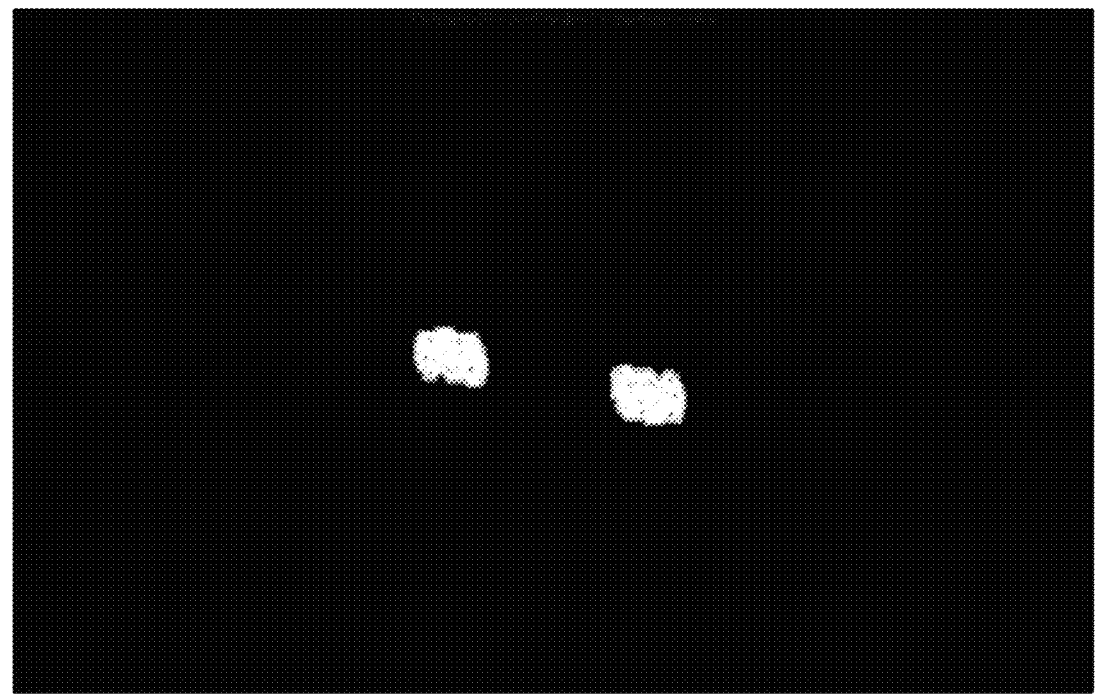
FIG. 18, Fast Fourier Transform (FFT) of sheet image og FIG. 5, after removal of information outside of contours.
Figure 19:
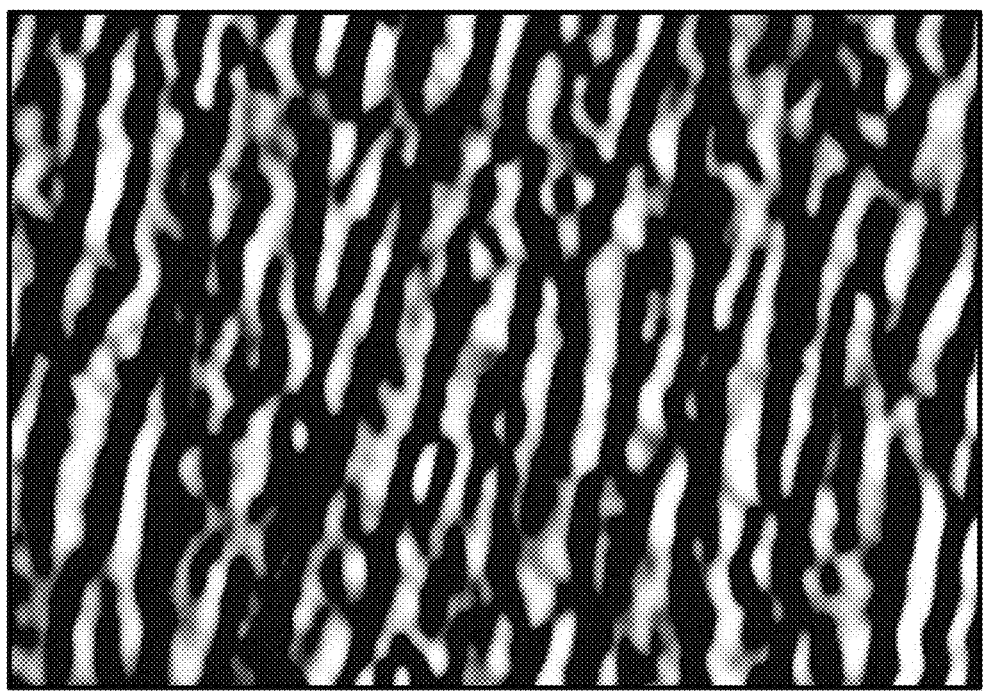
FIG. 19, Inverse of filtered FFT image of FIG. 5.

This example employs the image shown in FIG. 5. The image is transformed from the spatial domain to the frequency domain, which can be seen in FIG. 17. The right half of the image is the inverse of the left half of the image, this is characteristic of the transformation. The lighter areas contain the information for the largest, most dominant spatial features while the darker areas contain the information for the smaller, less dominant features. In FIG. 17 a contour is drawn around the brightest area on the image. The contour is drawn using the same methods in which the contours were drawn around the crepe ridges of FIG. 6. FIG. 18 shows the image from FIG. 17, but with all the information that was contained outside of the contour being removed. In other words, the information describing the smaller less dominant features, such as free fiber ends, have been deleted. This image is then subjected to the inverse transformation and is returned to the spatial domain, but without the deleted information and is seen in FIG. 19. Comparing FIGS. 5 and 19, the main crepe and trough features are common to both images. The contribution of the smaller features such as free fiber ends can be evaluated by applying the same metrics to both images and comparing the results. For example, histograms like those shown in FIGS. 7 and 8, distance between regions and light intensity can be calculated for both images and then compared. This process can be repeated multiple times with the contour drawn around regions of successively lighter or darker areas thus making it possible to quantify the contribution over a range of size the contribution to the overall crepe structure.

In yet another aspect of the current method, a two-dimensional transform is used to evaluate the position and shape of the contour used to outline the brightest area in the image. Since the image resulting from the FFT is symmetrical, only one half of the FFT is needed for the evaluation, which can be seen in FIG. 20. If the crepe pattern is a sinusoidal wave, the FFT would consist of a single dot on a black background. The amount of deviation from that pattern can be used as a measure of crepe uniformity and regularity. The geometric and light intensity metrics that were applied to the contours in the surface and edge image can be applied to the contour in the FFT image, thus providing a precise measurement to the outlined region in the two-dimensional FFT image of FIG. 20.

Figure 20:
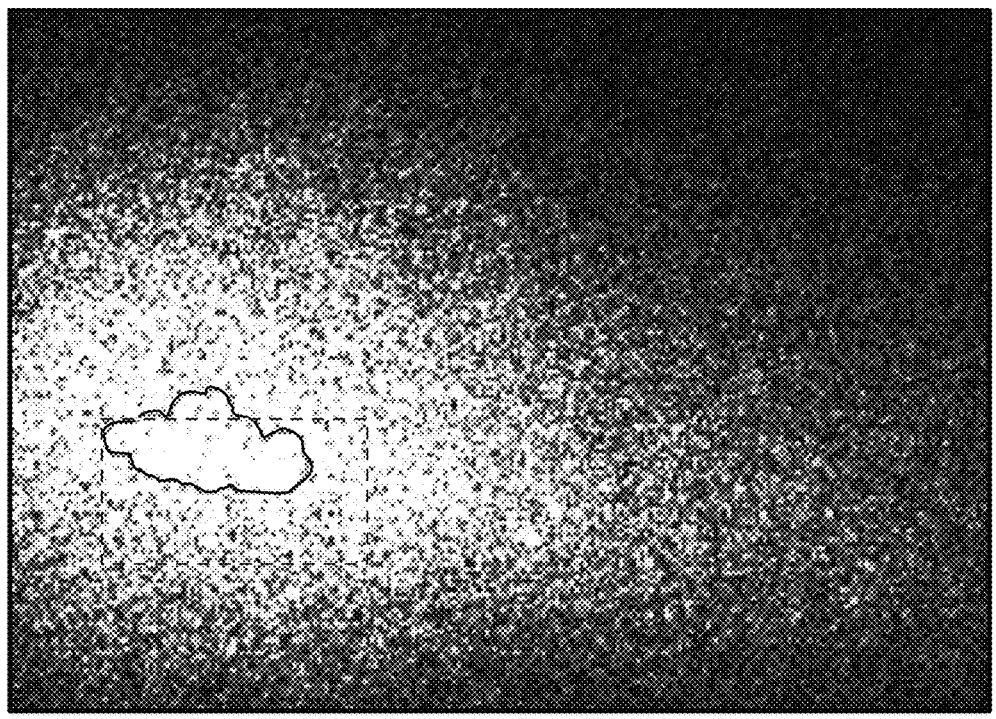
FIG. 20, One-half of FFT image of FIG. 17.

Although FIG. 20 shows a single contour, multiple contours can be created using successively lower intensity thresholds to determine the contour. The location, shape and size of the contours will change if there are changes to the crepe structure. A set of contours that represent the optimum crepe structure can be identified. During sheet production the optimum contours are compared to the real time measured contour and the deviation from the optimum determined. The amount of deviation from that pattern can be used as a measure of crepe uniformity and regularity. The advantage to this process is that specific features in the image do not have to be measured, simplifying the analysis process.

While embodiments of the invention have been illustrated by a description of various examples, and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed:

1. A method of characterizing creped sheet structure comprising:
    providing an imaging system comprising one or more imaging or photographic sensors or devices;
    generating one or more signals defining one or more images of a region of the creped sheet structure; and
    evaluating the generated image taken of the creped sheet structure with a two-dimensional spectral analysis tool using at least one metric to determine crepe ridge characteristics, crepe trough characteristics, characterization of an imposed three dimensional structure, sheet bulk, sheet internal disruptions, and/or free fiber ends of the creped sheet structure.

2. The method according to claim 1, wherein the creped sheet structure is an imposed three-dimensional structure.

3. The method according to claim 1, wherein the imaging or photographic sensors or devices comprise one or more cameras configured to render an image of the region of the creped sheet structure being evaluated.

4. The method according to claim 1, wherein the creped sheet structure has opposite upper and lower surfaces and terminates at an edge, and wherein the region of the creped sheet structure that is imaged is the edge of the creped sheet structure, and/or the upper and/or lower surface of the creped sheet structure.

5. The method according to claim 1, wherein the method comprises using the two-dimensional spectral analysis tool to determine the frequency of structure in the imaged region of the creped sheet structure.

6. The method according to claim 1, wherein the method comprises using imaging process techniques to highlight the crepe structure and to draw closed contours around the crepe ridge regions.

7. The method according to claim 1, wherein the imaged region of the creped sheet structure is evaluated in a machine direction and a cross direction.

8. The method according to claim 1, wherein the machine direction and cross direction of the creped sheet structure is evaluated using one or more of the metrics selected from the group consisting of region area; region perimeter; aspect ratio as defined by largest dimension/smallest dimension perpendicular to the largest dimension, average length/average width; closed contour perimeter/length; region boundary/width; region area/length; region area/width; elongation shape factor defined as $F_{elongation}=(I_{CD}/I_{MD})^{1/2}$, where $I_{CD}$ and $I_{MD}$ are the second moment of inertia in the MD and CD and the second moment of inertia is defined as $I_x=\iint x^2 dx\, dy$; compactness shape factor defined as $F_{compactness}=\text{Area}/[2\pi(I_{MD}^2+I_{CD}^2)^{1/2}]$; radius of gyration defined as $R_{gyration-CD}=[I_{CD}/\text{Area}]^{1/2}$ and $R_{gyration-MD}=[I_{MD}/\text{Area}]^{1/2}$; convex factor defined as $P_{convex}=$portion of region perimeter that is convex/total region perimeter; isoperimetric quotient defined as $Q=4\pi$ region area/region perimeter$^2$; roundness of regions are defined as the variation from a circle, light intensity in regions, light intensity between regions, number of regions in image that is then converted to a frequency number, minimum and maximum heights, vertical distribution of regions by size and shape, frequency of occurrence of long vertical regions, frequency of occurrence of short regions.

9. The method according to claim 1, wherein crepe ridges and/or around regions in the imposed three-dimensional structure of a creped structured sheet are evaluated within the region of the creped sheet structure being imaged.

10. The method according to claim 1, wherein the method comprises using the image to determine sheet bulk, sheet internal disruptions, free fiber ends, crepe structure and/or the imposed three-dimensional structure of a creped structured sheet.

11. The method according to claim 1, wherein the region of the creped sheet structure that is imaged is a machine direction edge of the creped sheet structure.

12. The method according to claim 11, wherein the method comprises using a two-dimensional spectral analysis tool to determine the frequency of structure in the imaged region of the creped sheet structure.

13. The method according to claim 11, wherein the method comprises using imaging process techniques to highlight the crepe structure and to draw closed contours around the crepe ridge regions.

14. The method according to claim 11, wherein the edge region of the creped sheet structure is evaluated using the at least one metric selected from the group consisting of region area; region perimeter; aspect ratio as defined by largest dimension/smallest dimension perpendicular to it, and ii) average length/average width; region boundary/length; region boundary/width; region area/length; region area/width; elongation shape factor defined as $F_{elongation}=(I_{CD}/I_{MD})^{1/2}$, where $I_{CD}$ and $I_{MD}$ are the second moment of inertia in the MD and CD and the second moment of inertia defined as $I_x=\iint x^2\, dx\, dy$; compactness shape factor defined as $F_{compactness}=\text{Area}/[2\pi(I_{MD}^2+I_{CD}^2)^{1/2}]$; radius of gyration defined as $R_{gyration-CD}=[I_{CD}/\text{Area}]^{1/2}$ and $R_{gyration-MD}=[I_{MD}/\text{Area}]^{1/2}$; convex factor defined as $P_{convex}=$portion of region perimeter that is convex/total region perimeter; isoperimetric quotient defined as $Q=4\pi$ region area/region perimeter$^2$; roundness of regions defined as the variation from a circle, light intensity in regions, light intensity between regions, number of regions in image that is then converted to a frequency number, minimum and maximum heights, vertical distribution of regions by size and shape, frequency of occurrence of long vertical regions, frequency of occurrence of short regions.

15. The method according to claim 11, wherein crepe ridges are evaluated within the region of the creped sheet structure being imaged.

16. The method according to claim 11, wherein the method comprises using the image to determine sheet bulk, sheet internal disruptions, free fiber ends, crepe structure and/or the imposed three-dimensional structure of a creped structured sheet.

* * * * *